US012300979B2

(12) United States Patent
Polonyi

(10) Patent No.: US 12,300,979 B2
(45) Date of Patent: May 13, 2025

(54) CLIP MODULE FOR POSITIONING A CLIP AT A PREDEFINED ASSEMBLY POSITION OF A CABLE RUN, AND ASSEMBLY HEAD COMPRISING SUCH A CLIP MODULE

(71) Applicant: LEONI Bordnetz-Systeme GmbH, Kitzingen (DE)

(72) Inventor: Ralph Polonyi, Augsburg (DE)

(73) Assignee: LEONI Bordnetz-Systeme GmbH, Kitzingen (DE)

( * ) Notice: Subject to any disclaimer, the term of this patent is extended or adjusted under 35 U.S.C. 154(b) by 533 days.

(21) Appl. No.: 17/639,987

(22) PCT Filed: Aug. 14, 2020

(86) PCT No.: PCT/EP2020/072828
§ 371 (c)(1),
(2) Date: Mar. 3, 2022

(87) PCT Pub. No.: WO2021/043561
PCT Pub. Date: Mar. 11, 2021

(65) Prior Publication Data
US 2022/0329051 A1    Oct. 13, 2022

(30) Foreign Application Priority Data
Sep. 3, 2019  (DE) ............... 10 2019 213 323.1

(51) Int. Cl.
*H02G 1/00* (2006.01)
*H02G 1/14* (2006.01)
*H02G 3/32* (2006.01)

(52) U.S. Cl.
CPC .............. *H02G 1/00* (2013.01); *H02G 1/14* (2013.01); *H02G 3/32* (2013.01)

(58) Field of Classification Search
CPC ............ H02G 1/00; H02G 1/14; H02G 3/32
See application file for complete search history.

(56) References Cited

U.S. PATENT DOCUMENTS

| | | | | |
|---|---|---|---|---|
| 4,148,130 A | * | 4/1979 | Stauffer | H01R 43/01 29/749 |
| 4,584,757 A | * | 4/1986 | Adlon | H01R 43/01 29/564.6 |
| 4,858,311 A | * | 8/1989 | Koch | H01R 43/28 29/748 |

(Continued)

FOREIGN PATENT DOCUMENTS

| | | | | |
|---|---|---|---|---|
| CN | 108666844 A | * | 10/2018 | ......... H01R 43/0486 |
| CN | 109790000 A | * | 5/2019 | ............. B66C 13/12 |

(Continued)

*Primary Examiner* — Jeffrey T Carley
(74) *Attorney, Agent, or Firm* — Laurence A. Greenberg; Werner H. Stemer; Ralph E. Locher

(57) ABSTRACT

A clip module is used for automatically positioning a clip at any angular position on a cable run. The clip module has a gripper having gripping elements for gripping the clip. These gripping elements can be adjusted between an open position and a gripping position by a control mechanism. Furthermore, a delivery unit is provided by which the gripper can be moved in a longitudinal direction and in a vertical direction. The gripper is rotatable and the gripping elements can be actuated in any angular position of the gripper.

20 Claims, 2 Drawing Sheets

(56) References Cited

U.S. PATENT DOCUMENTS

| | | | |
|---|---|---|---|
| 5,000,233 A | | 3/1991 | Oetiker |
| 5,477,596 A | * | 12/1995 | Schlosstein ............ B23Q 3/186 |
| | | | 29/33 K |
| 8,146,491 B2 | | 4/2012 | Schaety et al. |
| 10,965,083 B2 | * | 3/2021 | Pechter .................. H01R 43/28 |
| 2023/0304631 A1 | * | 9/2023 | Janway .................. H02G 11/00 |

FOREIGN PATENT DOCUMENTS

| | | | | |
|---|---|---|---|---|
| CN | 110415896 A | * | 11/2019 | ....... H01B 13/01209 |
| DE | 102005014838 A1 | * | 10/2006 | ............ B08B 9/426 |
| DE | 102008022337 A1 | | 11/2009 | |
| DE | 202013009153 U1 | | 1/2015 | |
| DE | 202016002623 U1 | | 8/2016 | |
| DE | 202019105184 U1 | * | 1/2020 | .............. H02G 1/00 |
| EP | 0242113 A1 | * | 10/1987 | |
| EP | 1424174 A1 | * | 6/2004 | ............. B25J 15/08 |
| EP | 1647486 A1 | | 4/2006 | |
| EP | 2317613 A1 | * | 5/2011 | ............ H01R 43/20 |
| EP | 3498614 A1 | | 6/2019 | |
| JP | 2003068154 A | | 3/2003 | |
| JP | 2004279546 A | | 10/2004 | |
| JP | 2010129456 A | | 6/2010 | |
| JP | 2011522355 A | | 7/2011 | |
| WO | WO-9418732 A1 | * | 8/1994 | ........... G02B 6/4416 |
| WO | 2015055753 A1 | | 4/2015 | |
| WO | 2018070368 A1 | | 4/2018 | |

* cited by examiner

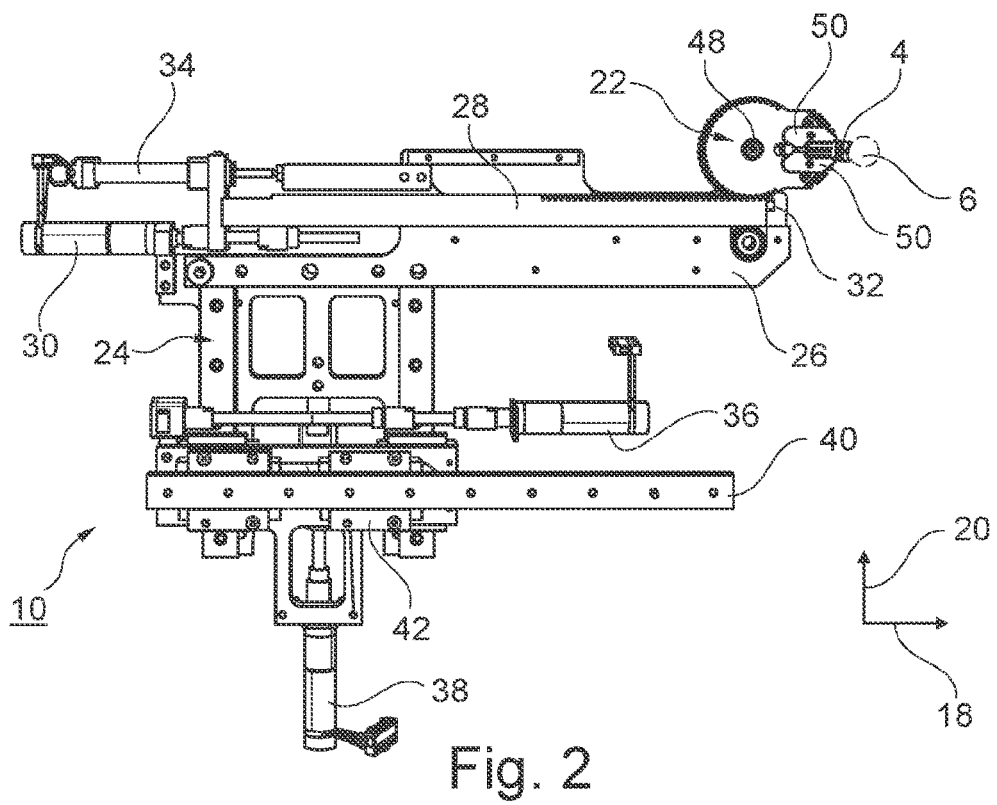
Fig. 2
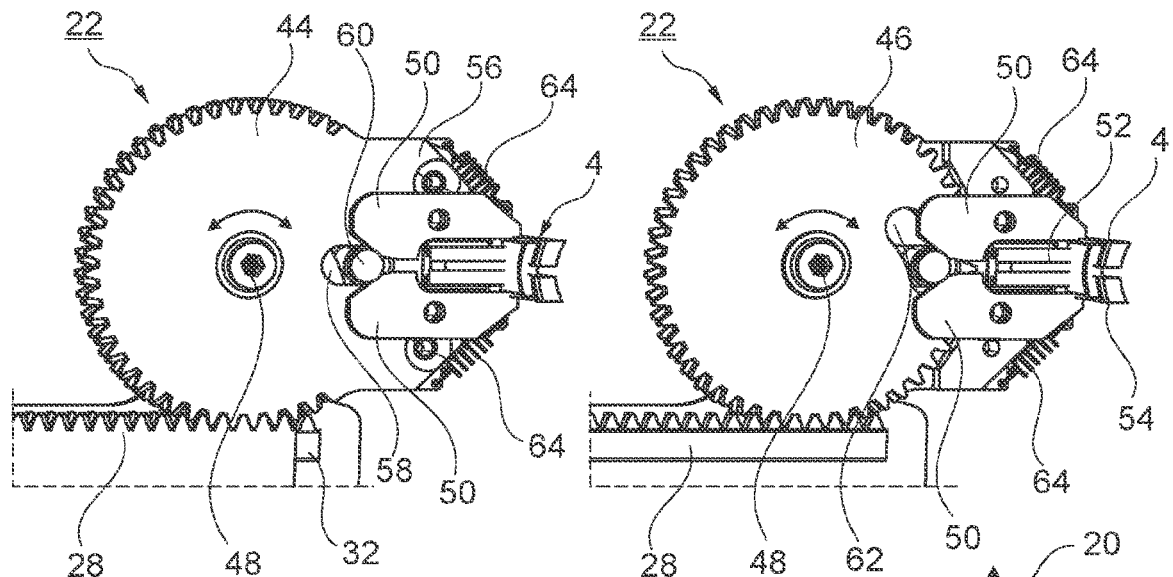
Fig. 3A
Fig. 3B

CLIP MODULE FOR POSITIONING A CLIP AT A PREDEFINED ASSEMBLY POSITION OF A CABLE RUN, AND ASSEMBLY HEAD COMPRISING SUCH A CLIP MODULE

FIELD AND BACKGROUND OF THE INVENTION

The invention relates to a clip module for positioning a clip on a cable run, and to an assembly head with a clip module of this type.

During the manufacture of, in particular, electrical cable harnesses, what are known as clips are frequently fastened to a cable run of the wiring harness, that is to say to a cable sheath. Here, a respective clip is configured in the manner of a fastening element and serves, for example, to fasten the cable harness to carrying elements, for example vehicle body elements, in order to fix the cable harness at a desired position. In addition, other elements can also be fastened to the clips.

Here, the clips which are used for the clip module in the present case typically have at least one and preferably two fastening limbs which run in the direction of the cable run and bear against the cable run in the assembled state. A pin-shaped element (fastening pin) typically extends perpendicularly with respect to this, via which pin-shaped element the above-described fastening function is carried out. Here, the fastening pin is configured, for example, in a fir tree-shaped manner and/or as a latching element or as another lug. Here, the fastening of the clips to the cable run typically takes place with the aid of a band, that is to say with the aid of an (adhesive) tape which is wound around the fastening limbs of the clip and the cable run.

An assembly station for the automated attachment of clips to a cable bundle can be gathered from WO 2015/055753 A1. Here, this assembly station has a clip module which serves to guide a clip onto a cable run. In addition, the assembly station has winding units, by way of which a tape for fastening the clips is guided around them.

Automated or fully automatic fastening of clips of this type is difficult, since, in particular, a plurality of clips frequently have to be fastened to a cable run at different angular positions, that is to say at different positions which are distributed over the circumference of the cable run.

SUMMARY OF THE INVENTION

Proceeding herefrom, the invention is based on the object of permitting automated positioning of clips on a cable run at any desired angular positions for subsequent fastening, in particular attaching the clips to the cable run by means of a band.

According to the invention, the object is achieved by way of a clip module which is configured to position a clip at a predefined assembly position, specifically at a predefined angular position of a cable run. Here, the clip module generally extends in a longitudinal direction, a transverse direction and vertical direction. The cable run, to which the clip is to be fastened, extends in the transverse direction.

Here, the clip module has a gripper which comprises gripping elements for gripping the clip. A control mechanism acts on the gripping elements, via which control mechanism the gripping elements can be adjusted in a controlled manner between an open position and a gripping position. The clip is released in the open position and, in the gripping position, the clip is held, in particular in a clamping manner, by the preferably precisely two gripping elements.

Furthermore, the clip module comprises a feed unit, by means of which the gripper can be moved in the longitudinal direction and in the vertical direction.

Furthermore, the gripper can be rotated about a rotational axis which extends in the transverse direction, and the gripping elements can be actuated by means of the control mechanism in different angular positions, in particular in any desired angular positions, of the gripper, that is to say can be adjusted between the open position and the gripping position. Therefore, the actuation of the gripping elements is independent of the respective angular position of the gripper. As a result of the combination of these measures, namely firstly the feeding capability of the gripper by way of the feed unit in the longitudinal direction and in the vertical direction, and secondly as a result of the superimposed rotational movability of the gripper and the actuation of the gripping elements in any desired angular positions, there is therefore the possibility that the clip can be positioned at different and, in particular, any desired angular positions, with the result that it can therefore be positioned at any desired angular positions around the circumference of the cable run.

In the present case, cable run is understood to mean generally an elongate, strand-shaped, in particular flexurally flexible element. This is, in particular, an electrical cable run with one or a plurality of electrical cable elements; specifically, this is a loose cable bundle consisting of a plurality of cable elements which are held on one another, for example, merely in sections by means of a band or the like. As an alternative, the cable run is configured as a hose, rod or tube.

Here, in one preferred refinement, the gripper can be rotated by at least 180°. It can preferably be rotated precisely by 180°, or can be rotated at least by a range, for example, of from 160° to 200°. As a result of the rotatability by at least or else precisely 180° combined with the feed movement, the gripper can be positioned in front of or behind the cable run, as viewed in the longitudinal direction, and can be rotated in each case by 180°, with the result that the complete circumference of the cable run can be gripped around by the gripper.

The gripper preferably has a first rotational element which can be rotated about the rotational axis and to which the gripping elements are fastened. This rotational element is, in particular, a rotary disk or specifically a gearwheel.

If a "disk" is spoken of in the present case, this is generally understood to mean at least one disk segment or else a complete disk.

Therefore, the rotational element is specifically configured as a gearwheel disk or, in particular, as a gearwheel segment. Here, this first rotational element is connected to a first rod, in particular to a first rack. The latter extends here in the longitudinal direction. Here, an actuation of the first rod leads to a rotational movement of the rotational element. To this end, the first rotational element and the first rod are connected to one another in a suitable way. In the case of a gearwheel and a rack, the teeth engage alternately into one another. Therefore, a linear movement of the first rod generally leads to a rotational movement of the first rotational element, to which the gripping elements are fastened. The first rod is generally a first actuating element, by way of which the first rotational element can be set in a rotational movement.

In one expedient refinement, the control mechanism, via which the gripping elements can be adjusted between their open and gripping position, has a control cam for actuating the gripping elements. That is to say, the gripping elements are transferred from the open position into the gripping position and/or vice versa with the aid of the control cam.

Here, the gripping elements are preferably configured in the manner of rocker arms which can be tilted or pivoted about a tilting axis. Here, the gripping elements generally extend in a lever longitudinal direction from a control end to a gripping end. Here, the control cam acts on one end of the gripping elements, namely on the abovementioned control end. The control end has, for example, control faces which are, in particular, positioned obliquely and against which the control cam is displaced, with the result that the two control ends, in particular lying opposite one another, of the gripping elements are pressed apart from one another in a manner which is controlled by way of the control cam. As a result of the configuration as rocker arms, this leads to bringing together of the gripping ends and therefore to clamping of the clip. Here, the control cam is generally adjusted in the direction of the lever longitudinal axis, preferably within the context of a linear movement.

As an alternative to a linear adjustment of the control cam, other movement sequences are also possible, for example an eccentric movement of the control cam. In this case, for example, the control cam is mounted rotatably and can be rotated in a suitable way by means of a drive unit, for example a belt drive.

Here, in one preferred refinement, the control cam can generally be adjusted independently of the rotational movement of the first rotational element. That is to say, the control cam can be actuated independently of the respective rotational position of the gripper, in order to actuate the gripping elements independently of the current rotational position.

In order to actuate the control cam, in one preferred refinement, the control mechanism has a control element, in particular a control disk and specifically a second gearwheel, which can be rotated about the rotational axis. Here, the control element has a spiral slotted guide, in which the control cam is guided. In the case of a relative movement of the control cam relative to the slotted guide when the control cam moves in this slotted guide, this leads, on account of the spiral configuration, to a spacing of the control cam from the rotational axis being changed. Therefore, a radial spacing is varied as a result of the spiral slotted guide, such that, as a result, a radial movement of the control cam in or counter to the direction, in which the gripping elements are oriented, is carried out specifically in or counter to the lever longitudinal direction. The gripping elements, specifically their lever longitudinal direction, are oriented, exactly or at least substantially, in the radial direction.

Here, the control element, specifically the second gearwheel or gearwheel disk, is once again of at least segment-like configuration, and is preferably configured as a full disk.

A "spiral slotted guide" is understood to mean, in particular, a guide groove which is made in the control element and is configured, for example, as a continuous slot. The guide groove runs arcuately, the radial spacing from the rotational axis varying.

The first rotational element preferably has a guide which extends in a radial direction and in which the control cam is additionally guided. The control cam is therefore guided, in particular, both in the slotted guide of the control element and in the further guide of the first rotational element. As a result of this measure, an adjusting movement of the control cam in the radial direction is made possible in the case of a relative movement, in particular a relative rotational movement, between the control element, in particular the second gearwheel, and the first rotational element, in particular the first gearwheel. Conversely, the control cam remains at a defined radial position as long as the control element and the first rotational element rotate jointly about the rotational axis. As a result of this configuration of the control mechanism, therefore, the control cam can therefore be actuated at any desired angular positions of the first rotational element, and therefore at any desired angular positions of the gripping elements, by way of a relative movement of the control element with respect to the first rotational element.

Here, the guide on the first rotational element is configured, in particular, as a groove-like guide on the control element, which groove-like guide extends, in particular, from an edge in the radial direction toward the rotational axis. This is specifically a slot which is open on the edge side.

In one preferred refinement, the gripping elements can be transferred into a starting position in a manner actuated by spring force. Here, the starting position is, in particular, the open position. Via the control cam, therefore, the gripping elements are held positively in a forced position, in particular the gripping position. When the control cam is returned into its starting position (positively guided via the control mechanism), with the result that the gripping elements are therefore released, a spring ensures purely passively that the gripping elements are returned again into their open position which is the starting position.

The rotatable control element is connected to a second rod which extends in the longitudinal direction. Via the second rod, the control element is therefore set in a rotational movement. Specifically, a linear movement of the second rod is converted into a rotational movement of the control element. The second rod is in particular a second rack. The second rod is generally a second actuating element, by means of which the control element is actuated, in particular is set in a rotational movement.

Overall, in one preferred refinement, the first rotational element is therefore configured as a first gearwheel and the control element is configured as a second gearwheel, which gear wheels are connected in each case via a first rack (first rod) and second rack (second rod) in order to carry out the rotational movement. The two gearwheels, that is to say generally the first rotational element and the control element, are arranged here, in particular, together on a common shaft which extends along the rotational axis.

In one expedient development, it is generally provided that the control element is positively coupled to the first rotational element in such a way that the control element forcibly corotates in the case of a rotational movement of the first rotational element. Specifically, this is realized by way of coupled positive guidance between the two actuating elements, that is to say between the second rod for the control element and the first rod for the first rotational element. This leads overall to a rotational movement of the first rotational element and therefore of the gripping elements taking place without an adjustment of the control cam. At the same time, the control element can be (additionally) rotated about the rotational axis independently of the first rotational element, with the result that the controlled radial adjustment of the control cam and thus the actuation of the gripping element therefore take place as a result.

In one expedient refinement, a first drive, in particular a linear drive, for the first rod and a second drive, in particular a linear drive, for the second rod are provided. These drives are, for example, pneumatic, hydraulic or electric drives.

For the desired, above-described positive coupling, in one preferred refinement, the second drive is coupled to the first drive in such a way that, in the case of a feed movement of the first drive, the second drive is also moved. The second drive is therefore positively coupled to the movement of the first rod, that is to say is connected to the latter at least indirectly. Overall, this leads to the second rod being coupled to the first rod and being forcibly moved together with the latter. At the same time, this refinement makes it possible that the second drive can actuate the second rod in any desired positions of the first rod and therefore, in particular, also at any desired angular positions of the gripper.

In one expedient refinement, the first rod has a U-shaped profile, and the second rod is guided in this U-shaped profile. The second rod is therefore preferably arranged such that it can be displaced telescopically within the first rod.

The control element is expediently arranged between two first rotational elements. The control element is therefore received in a sandwich-like manner between two first rotational elements. This arrangement achieves, in particular, reliable and satisfactory guidance specifically of the control cam. The latter lies, for example, loosely in the slotted guide and in the guides of the first rotational elements.

The first rod is fastened, in particular, on a carrier of the feed unit. That is to say, the first rod performs the same movements in the longitudinal direction and the vertical direction as the feed unit.

In one preferred refinement, the gripper and, in particular, also the abovementioned carrier with the first rod arranged on it have a width in the transverse direction of at most 20 mm and preferably of at most 15 mm. As a result, a design which is overall highly compact is achieved. As a result, attaching by band is possible as close as possible to the fastening pin of the clip.

According to the invention, furthermore, the object is achieved by way of an assembly head which has an above-described clip module. At least one winding module is also arranged in addition to the clip module, which winding module is configured to apply a band around the clip and therefore to fasten the latter to the cable run.

Therefore, automated or fully automatic positioning of a clip and fastening thereof by means of band application to a cable run are made possible by means of the assembly head. The clip module is integrated, for example, into a winding head, as can be gathered from WO 2015/055 753 A1.

The at least one winding module is preferably arranged in the transverse direction, in particular, directly next to the clip module. In each case one winding module is expediently arranged on both sides of the clip module, which winding modules are configured in each case for automatically attaching the band to the fastening limbs of the clip. The spacing between the winding modules preferably corresponds to the width of the gripper of the clip module or the width of the clip module.

One exemplary embodiment of the invention will be described in greater detail in the following text on the basis of the figures.

BRIEF DESCRIPTION OF THE FIGURES

FIG. 2 shows a side view of a clip module, FIG. 3A shows an enlarged side view of the clip module in the region of the gripper, and FIG. 3B shows a side view, similar to FIG. 3A, with a view of an exposed control element.

DETAILED DESCRIPTION OF THE INVENTION

Figure 1:
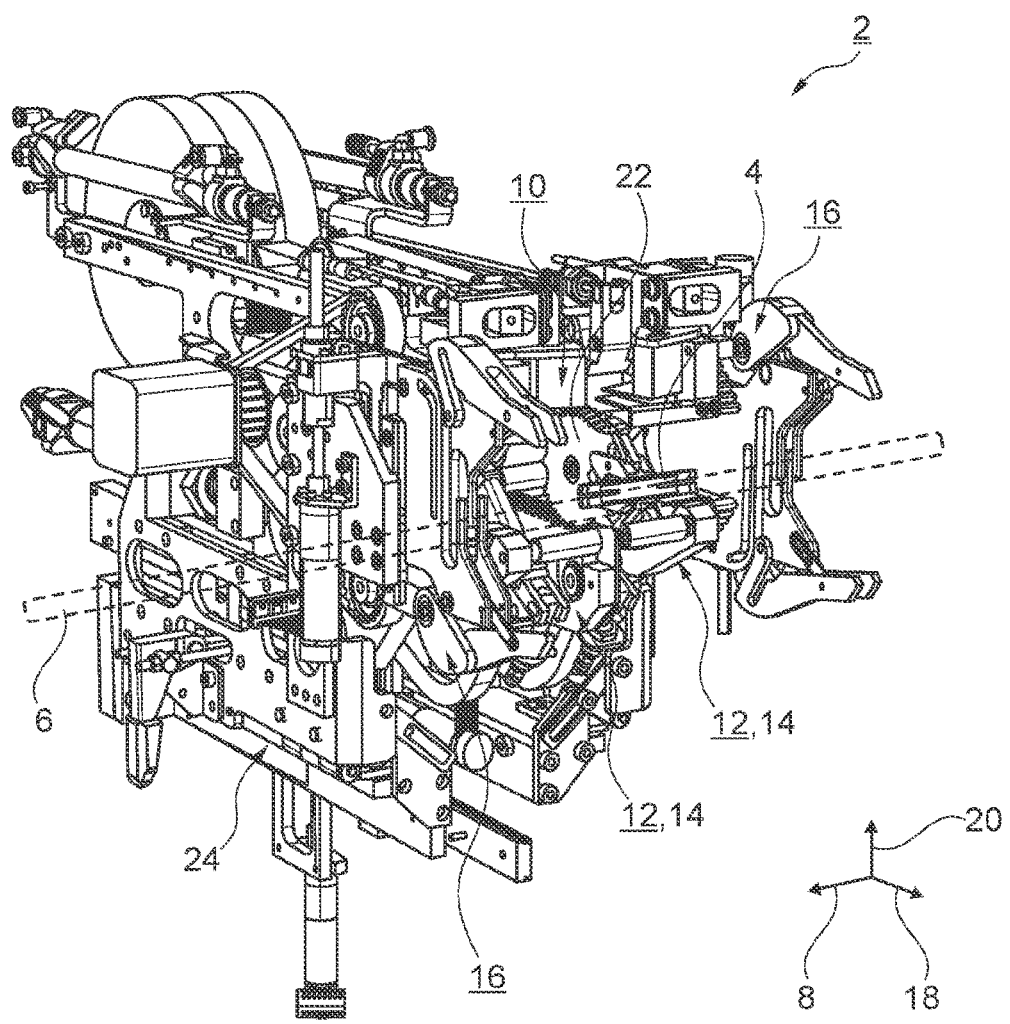
FIG. 1 shows a perspective illustration of an assembly head for automatically fastening a clip to a cable run.

In the figures, identically acting parts are provided with the same designations.

FIG. 1 shows an assembly head 2, which serves to automatically fasten clips 4 to a cable run 6 which is shown using dashed lines in FIG. 1.

Here, the assembly head 2 is composed of a plurality of modules which are arranged next to one another in a transverse direction 8. The assembly station 2 has a clip module 10 which is configured to position and to guide the clip 4 onto the cable run 6, to be precise in such a way that the clip 4 can be positioned at any desired angular positions around the circumference of the cable run 6.

In each case one winding module 12 is arranged on both sides next to the clip module 10, which winding module 12 has in each case one winding head 14, by way of which a tape is wound around the clip 4 in order to form a band for fastening this clip 4 to the cable run 6. At its outermost, opposite ends, the assembly head 2 preferably also has in each case one fixing module 16, by way of which the cable run 6 is fixed in a stationary manner, in particular in a clamping manner, for example, with the aid of adjustable clamping elements, in particular clamping jaws. The assembly head 2 which is shown here, specifically the construction of the winding modules, is described in the application of the applicant, submitted at the same time as the present application, with the title "Assembly head and method for automated wrapping of a cable run".

Furthermore, the assembly head 2 is preferably fastened to an automatic adjusting device, in particular to a robot, specifically to a multiple-axle jointed arm robot. A respective clip is received from a provision station, at which the clips are provided separately, and is transferred to an assembly station, at which the cable run 6 is provided. By means of the clip module 10, the gripped clip is positioned at the desired position of the cable run 6 and is subsequently fastened there with the aid of the at least one winding module 12.

The clip module 10 which is preferably situated in the center of the assembly head 2 between two winding modules 12 is configured here in such a way that the clip 4 can be guided to any desired angular position around the circumference of the cable run 6.

The specific construction of the clip module 10 will be described in greater detail in conjunction with FIGS. 2 and 3A, 3B.

The clip module 10 extends first of all in a longitudinal direction 18, in a vertical direction 20 which is oriented perpendicularly with respect to this longitudinal direction 18, and in the transverse direction 8 which is once again oriented perpendicularly with respect to this vertical direction 20. As essential components, the clip module 10 has a gripper 22 and a feed unit 24, by means of which the gripper 22 can be adjusted in the longitudinal direction 18 and the vertical direction 20, and can therefore be fed in the direction toward the cable run 6 (shown using dashed lines in FIG. 2).

The feed unit 24 has a carrier 26 which defines, in particular, an upper end of the feed unit 24. A first rod (first actuating element) which is configured as a first rack 28 is arranged on this carrier 26. This first rod can be adjusted by means of a first drive 30 in the longitudinal direction 18 relative to the carrier 26 and therefore relative to the feed unit 24. The first drive 30 is, in particular, a linear drive, for example a cylinder drive, in the case of which a piston is extended in order to carry out the actuating movement. The first drive 30 is fastened to the carrier 26.

Here, the first rack 28 is, in particular, of U-shaped configuration with a longitudinal groove, in which a second (control) rod (second actuating element) which is configured as a second rack 32 is arranged. The second rack 32 is arranged such that it can be displaced within the groove of the first rack 28. The second rack 32 is guided displaceably once again in the longitudinal direction 18 and within the first rack 28 relative to the latter with the aid of a second drive 34. The second drive 34 is preferably once again configured as a linear drive and, for example, as a cylinder with an extendable piston.

The second drive 34 is fixedly connected mechanically, for example via a connecting plate, to the first drive 30, specifically to an extendable element (piston) of the first drive 30. Therefore, an actuating movement of the first drive 30 leads to the complete second drive also forcibly being moved. This has the consequence that, in the case of an adjustment of the first rack 28 with the aid of the first drive 30, the second rack 32 is forcibly also adjusted, without a relative movement taking place between the two racks 28, 32.

A third drive 36 is arranged for the feed movement of the feed unit 24 in the longitudinal direction 18, and a fourth drive 38 is arranged for the movement of the feed unit 24 in the vertical direction 20. These drives are preferably once again configured as linear drives for carrying out linear actuating movements. All of the drives 30, 34, 36, 38 are configured, for example, as pneumatic or hydraulic cylinders or else as electric motor actuating drives. The fourth drive 38 for carrying out the movement in the vertical direction 20 is fixed, for example, on further components of the assembly head 2. A longitudinal guide 40, for example a longitudinal rail, can be adjusted in the vertical direction 20 by way of the fourth drive 38. A carrying unit 42 which can be displaced in the longitudinal direction 18 by means of the third drive 36 is arranged on this longitudinal guide 40, to which carrying unit 42 the abovementioned carrier 26 is once again fastened.

As a result of the U-shaped configuration of the first rack 28, the latter has, at least in a front end region (cf. FIG. 2 in this regard), two rows of teeth which are configured on the upper end sides of the U-shaped profile. Here, a rotational element which is configured as a first gearwheel 44 engages into each of these rows of teeth. There is fundamentally also the possibility that merely a (single) first gearwheel 44 and merely a single first rack 28 without a U-shaped profile are provided.

In a similar way, a second gearwheel 46 which is configured as a control element is connected to the second rack 32. The gearwheels 44, 46 can be rotated about a common rotational axis 48 and are arranged, for example, on a common rotary shaft.

Here, the gearwheels 44, 46 are part of the gripper 22. The latter additionally has two gripping elements 50 which are preferably configured in the manner of rocker arms which can be tilted about a tilting axis. The gripping elements 50 extend along a rocker arm longitudinal axis which corresponds to a radial direction with regard to the rotational axis 48, from a rear (control) end to a front gripping end. The clip 4 is gripped between the gripping elements 50 by being clamped in between the two gripping ends. The gripping elements 50 are fastened to the first gearwheel 44.

As can be seen specifically from the enlarged illustration of FIGS. 3A and 3B, the clip 4 has a central fastening pin 52 which, when it is gripped by the gripper 22, extends in the radial direction (with regard to the rotational axis 48). The fastening pin 52 is adjoined perpendicularly with respect thereto, that is to say in the transverse direction 8, by at least one and preferably two fastening limbs 54 which are therefore configured on both sides of the fastening pin 52 and extend in the transverse direction 8. The tape for the band is later wound around these fastening limbs 54 and the cable run 6.

Here, the entire width of the gripper 22 in the transverse direction 8 lies overall in a range up to at most 20 mm, preferably up to at most 15 mm and preferably up to approximately 12 mm. This achieves a situation where merely the fastening pin 52 is gripped and the tape can be guided as close as possible to the fastening pin.

The first gearwheel 44 is overall of approximately disk-shaped configuration, there being a deviation from the circular shape over a certain angular region of, for example, approximately 90°, and a type of fastening flange 56 being formed, to which the gripping elements 50 can be fastened such that they can be tilted about the tilting axis.

Furthermore, the first gearwheel 44 has a guide 58 which extends in the radial direction and which is configured, in particular, as a slot which is preferably open toward the edge side. Here, the guide 58 extends in the radial direction toward the rotational axis 48. A pin which is called a control cam 60 in the following text is guided within this guide 58.

This control cam 60 therefore generally defines another control element, via which the gripping elements 50 can be actuated.

The second gearwheel 46 which, just like the first gearwheel 44 in the exemplary embodiment, is configured as a gearwheel disk, has a spiral slotted guide 62. The control cam 60 is likewise guided in this slotted guide 62. Here, the slotted guide 62 extends, for example, in the circumferential direction over an angular range of merely from 20° to 60°.

The second gearwheel 46 with the associated second rack 32 and the second drive 34 are, in combination with the control cam 60, the guide 58 and the slotted guide 62, part of a control mechanism or configure a control mechanism, by way of which the gripping elements 50 are actuated. The latter are preferably transferred positively and in a force-actuated manner into a gripping position by way of the control mechanism, specifically with the aid of the control cam 60, as shown in FIGS. 3A and 3B. To this end, the control cam 60 is displaced into a radially front position. At the rear-side (control) ends, the gripping elements 50 have control faces which run obliquely with respect to the longitudinal direction 18 and along which the control cam 60 slides. In the case of a displacement of the control cam 60 in the radial direction, that is to say in the direction toward the gripping elements 50, the rearward (control) end is pressed apart, with the result that the fastening pin 52 is clamped.

Furthermore, a (tension) spring 64 is provided for each gripping element 50, which (tension) spring 64 acts firstly on the front (gripping) end of the gripping element 5 and on the first gearwheel 44, specifically on the fastening flange 56. With the aid of the spring force, the gripping elements 50 are returned passively and automatically into a starting position which corresponds to the open position. This takes place automatically as soon as the control cam 60 has been reset again in the radial direction in the direction of the rotational axis 48 and therefore releases the gripping elements 50.

Here, the controlled movement sequence of the control cams 60 is as follows:

In the case of a displacement of the first rack 28 in the longitudinal direction 18, the second rack 32 is first of all forcibly also moved. As a result, the first gearwheel 44 and the second gearwheel 46 rotates synchronously about the rotational axis 48. As a result, the gripping elements 50 are first of all transferred into a desired angular position with regard to the cable run 6. This takes place in the case of a gripped clip 4. Subsequently, the attachment of the tape to the fastening limbs 54 for fastening the clip 4 takes place.

After this, the gripping elements 50 are released and are returned into their open position. To this end, a relative rotational movement between the two gearwheels 44, 46 is then required. To this end, the second rack 32 is displaced relative to the first rack 28 in the longitudinal direction 18. As a result of the guidance of the control cam 60 firstly in the spiral slotted guide 62 and secondly in the radial guide 58, the control cam 60 is positively adjusted in the radial direction. Here, in order to release and open the gripping elements, the control cam 60 is displaced toward the rotational axis 48. To this end, in the exemplary embodiment of FIG. 3B, a rotational movement of the second gearwheel 46 in the clockwise direction is therefore required.

As described above, in each case one clip 4 is received from a provision station by means of the gripper 22. The clip module 10 and, in particular, the entire assembly head 2 preferably move to this provision station and receive the clip. To this end, the gripper 22 is guided with the gripping elements 50 over the clip 4. For clamping fixing, the control cam 60 is subsequently moved forward in the radial direction (away from the rotational axis 48). To this end, a relative movement between the two gearwheels 44, 46 via the drive of the second rack 32 is required and is performed.

The entire movement sequence for positioning the clip 4 is therefore overall as follows:
a) First of all, the gripping elements 50 are transferred into their starting position (open position) and receive the clip 4.
b) The clip 4 is clamped by the gripping elements 50 as a result of the controlled movement of the control cam 60.
c) The clip is subsequently guided onto the cable run 6. To this end, the gripper 22 is first of all transferred to a desired longitudinal and vertical position with the aid of the feed unit 24. At the same time, a defined angular position is assumed on the circumference of the cable run 6 by means of a rotational movement of the gripper, specifically via the first gearwheel 44.
d) The application of a band to the fastening limbs 54 subsequently takes place.
e) After the application of a band, the gripping elements 50 are released again, by the control cam 60 being returned and the gripping elements 50 being opened by way of the springs 64.

The cycle begins again after this.

Overall, a rotational movement of the gripper 22 by 180° is possible. Here, the gripping elements 50 can assume any desired angular positions. The control of the control cam 60 is made possible in any desired angular position. Proceeding from FIGS. 3A and 3B which show a rotational end position of the gripper 22, the gripper 22, specifically the first gearwheel 44, can be rotated about the rotational axis 48 by 180° counter to the clockwise direction.

LIST OF DESIGNATIONS

2 Assembly station
4 Clip
6 Cable run
8 Transverse direction
10 Clip module
12 Winding module
14 Winding head
16 Fixing module
18 Longitudinal direction
20 Vertical direction
22 Gripper
24 Feed unit
26 Carrier
28 First rack
30 First drive
32 Second rack
34 Second drive
36 Third drive (longitudinal direction)
38 Fourth drive (vertical)
40 Longitudinal guide
42 Supporting unit
44 First gearwheel
46 Second gearwheel
48 Rotational axis
50 Gripping elements
52 Fastening pin
54 Fastening limb
56 Fastening flange
58 Guide
60 Control cam
62 Slotted guide
64 Spring

The invention claimed is:

1. A clip module extending in a longitudinal direction, a transverse direction and a vertical direction, and configured for positioning a clip at a predefined assembly position on a cable run extending in the transverse direction, the clip configured as a fastening element for fastening the cable run to a carrying element in order to fix the cable run at a desired position, the clip module comprising:
   a gripper having gripping elements for gripping the clip;
   a control mechanism acting on said gripping elements for adjusting said gripping elements between an open position and a gripping position;
   a feed unit for moving said gripper in the longitudinal direction and in the vertical direction; and
   said gripper being rotatable about a rotational axis extending in the transverse direction for rotation into different angular positions around a circumference of the cable run for guiding the clip into any desired angular position around the circumference of the cable run for fixing the cable run at a desired position, said control mechanism being configured for opening and closing said gripper elements in the different angular positions of said gripper between the open position and the gripping position.

2. The clip module according to claim 1, wherein said gripper is rotatable by at least 180°.

3. The clip module according to claim 1,
   further comprising a first rod; and
   wherein said gripper has a first rotational element which is rotatable about the rotational axis, said gripping elements are fastened to said first rotational element and said first rotational element is connected to said first rod, said first rod is adjustable the longitudinal direction in order to carry out a rotational movement of said first rotational element.

4. The clip module according to claim 3, wherein said control mechanism has a control cam to act on said gripping elements to actuate said gripping elements.

5. The clip module according to claim 4, wherein said gripping elements are configured as rocker arms, and said control cam acts on one end of said gripping elements.

6. The clip module according to claim 4, wherein said control cam is constructed for adjustment independent of the rotational movement of said first rotational element.

7. The clip module according to claim 4, wherein said control mechanism has a control element rotatable about the rotational axis and has a spiral slotted guide formed therein, said control cam is guided in said spiral slotted guide, with a result that a spacing of said control cam from the rotational axis is changed by a movement of said control cam and said spiral slotted guide.

8. The clip module according to claim 4, wherein said first rotational element has a guide formed therein which extends in a radial direction and said control cam is guided in said guide.

9. The clip module according to claim 1, wherein said gripping elements have springs that transfer said gripping elements into a starting position.

10. The clip module according to claim 7, further comprising a second rod, said control element being a rotatable control element is connected to said second rod which extends in the longitudinal direction.

11. The clip module according to claims 7, wherein said control element is positively coupled to said first rotational element, with a result that said control element forcibly corotates in a case of a rotational movement of said first rotational element.

12. The clip module according to claim 10, further comprising:
a first drive for said first rod; and
a second drive for said second rod.

13. The clip module according to claim 12, wherein said second drive is coupled to said first drive in such a way that, in a case of a feed movement of said first drive, said second drive is moved together with said second rod.

14. The clip module according to claim 10, wherein said first rod has a U-shaped profile, and said second rod is disposed in said U-shaped profile.

15. The clip module according to claim 7, wherein:
said first rotational element is one of a plurality of first rotational elements; and
said control element is disposed between two said first rotational elements.

16. The clip module according to claim 3, wherein said feed unit has a carrier, on which said first rod is fastened.

17. The clip module according to claim 1, wherein said gripper has a width in the transverse direction of at most 20 mm.

18. The clip module according to claim 3, wherein said first rotational element is a first gearwheel.

19. The clip module according to claim 7, wherein said control element is a second gearwheel.

20. An assembly head for automatically fastening a clip to a cable run, the assembly head comprising:
said clip module according to claim 1; and
at least one winding module configured for winding a tape around the clip and fastening the clip to the cable run.

* * * * *